United States Patent [19]

Hamada

[11] Patent Number: 5,353,889
[45] Date of Patent: Oct. 11, 1994

[54] POWER TRANSMITTING DEVICE FOR FOUR-WHEEL DRIVE VEHICLE

[75] Inventor: Tetsurou Hamada, Saitama, Japan

[73] Assignee: Honda Giken Kogyo Kabushiki Kaisha, Tokyo, Japan

[21] Appl. No.: 32,953

[22] Filed: Mar. 17, 1993

[30] Foreign Application Priority Data

Mar. 17, 1992 [JP] Japan ..................... 4-060612

[51] Int. Cl.⁵ .......................... B60K 17/348
[52] U.S. Cl. ................... 180/242; 74/665 T; 180/76; 180/243
[58] Field of Search ............... 180/233, 242, 247, 243, 180/76; 74/650, 665 T; 475/85

[56] References Cited

U.S. PATENT DOCUMENTS

| 4,681,180 | 7/1987 | Oyama et al. | 74/650 |
| 5,117,936 | 6/1992 | Nakamura et al. | 180/242 |

FOREIGN PATENT DOCUMENTS

| 43329 | 11/1965 | Fed. Rep. of Germany . | |
| 4036280 | 5/1991 | Fed. Rep. of Germany . | |
| 63-33590 | 7/1988 | Japan . | |
| 2119905 | 11/1983 | United Kingdom | 180/242 |
| 2239922 | 7/1991 | United Kingdom . | |
| 2245237 | 1/1992 | United Kingdom . | |
| 2257487 | 1/1993 | United Kingdom . | |

Primary Examiner—Mitchell J. Hill
Attorney, Agent, or Firm—Lyon & Lyon

[57] ABSTRACT

A power transmitting device for a four-wheel drive vehicle which includes main driven wheels driven directly by an engine and speed-change transmission, a left sub-driven wheel driven through a first hydraulic pressure clutch, a right sub-driven wheel driven through a second hydraulic pressure clutch, a first hydraulic pump driven in operative association with the main driven wheels, a second hydraulic pump driven in operative association with the left sub-driven wheel, a third hydraulic pump driven in operative association with the right sub-driven wheel, a first oil passage which connects a discharge port of the first hydraulic pump to intake ports of the second and third hydraulic pumps, and a second oil passage which connects the first oil passage to a working chamber in the first hydraulic pressure clutch and a working chamber in the second hydraulic pressure clutch. The three hydraulic pumps and hydraulic circuit are arranged such that the vehicle operates in a four-wheel drive mode only when the vehicle is first starting to travel and when the speed of the vehicle is increased. The vehicle operates in a main driven wheel drive mode when the vehicle is travelling at a constant speed and when the speed of the vehicle is reduced.

25 Claims, 8 Drawing Sheets

FIG.7

POWER TRANSMITTING DEVICE FOR FOUR-WHEEL DRIVE VEHICLE

BACKGROUND OF THE INVENTION

1. Field of the Invention

The present invention relates to a power transmitting device for a four-wheel drive vehicle which is constructed so that front and rear wheels can be driven by a common engine, and particularly, power transmitting devices in a four-wheel drive vehicle which includes main driven wheels driven directly from the engine and speed-change transmission, a left sub-driven wheel driven through a first hydraulic pressure clutch, and a right sub-driven wheel driven through a second hydraulic pressure clutch.

2. Description of the Prior Art

There is a known form of a power transmitting device in a four-wheel drive vehicle, in which one of front and rear axles is connected directly to an engine and speed-change transmission, such that a driving force is transmitted from one axle (main driven axle) through a viscous hydraulic joint of a relative rotation sensitive type to the other axle (sub-driven axle).

Among the power transmitting devices of such type, there is a power transmitting device known from U.S. Pat. No. 4,721,010 end corresponding Japanese Patent Publication No. 33590/88, in which front wheels as main driven wheels are driven directly by an engine, and two viscous hydraulic joints are provided between left and right rear wheels as sub-driven wheels, so that the device has a differential function and a differential limiting function not only between the front and rear wheels but also between the left and right rear wheels. With this power transmitting device, if a relative rotational speed is generated between the front and rear wheels, not only a driving force is transmitted to the rear wheels, but also when a difference in friction coefficient of a road surface is generated between the left and right rear wheels, driving forces corresponding to the friction coefficients of the road surface can be distributed to the left and right rear wheels, respectively.

In the above prior art power transmitting device, the connection force between the main driven wheels and the sub-driven wheels is controlled on the basis of the relative rotational speed between the main driven wheels and the sub-driven wheels. Therefore, when the main driven wheels slip during acceleration of the speed of the vehicle, so that the rotational speed thereof exceeds that of the sub-driven wheels, the driving force is transmitted to the sub-driven wheels. On the other hand, when the main driven wheels show a locking tendency due to a hard braking, so that the rotational speed thereof becomes less than that of the sub-driven wheels, the braking force of the main driven wheels is transmitted to the sub-driven wheels and, as a result, there is a possibility of changing the distribution of the braking force between the main driven wheels and the sub-driven wheels.

SUMMARY OF THE INVENTION

Accordingly, it is an object of the present invention to provide a power transmitting device in a four-wheel drive vehicle, which is designed such that a connection force is generated between the main driven wheels and the sub-driven wheels only when the rotational speed of the main driven wheels exceeds that of the sub-driven wheels.

To achieve the above object, according to the present invention, there is provided a power transmitting device for a four-wheel drive vehicle which includes main driven wheels driven directly by an engine and speed-change transmission, a left sub-driven wheel driven through a first hydraulic pressure clutch, and a right sub-driven wheel driven through a second hydraulic pressure clutch, the device comprising a first hydraulic pump driven in operative association with the main driven wheels, a second hydraulic pump driven in operative association with the left sub-driven wheel, a third hydraulic pump driven in operative association with the right sub-driven wheel, a first oil passage which connects a discharge port of the first hydraulic pump to intake ports of the second and third hydraulic pumps, and a second oil passage which connects the first oil passage to a working chamber in the first hydraulic pressure clutch and a working chamber in the second hydraulic pressure clutch.

With the above arrangement, when the vehicle is started, or when the vehicle is rapidly accelerating, the amount of oil discharged from the first hydraulic pump driven in operative association with the main driven wheels exceeds the sum of the amounts of oil discharged from the second and third hydraulic pumps driven in operative association with the left and right sub-driven wheels. Therefore, a hydraulic pressure generated in the first oil passage connecting the discharge port of the first hydraulic pump to the intake ports of the second and third hydraulic pumps causes the first and second hydraulic pressure clutches to be brought into engagement through the second oil passage and hence, a driving force from the engine can be transmitted to the sub-driven wheels. On the other hand, when the vehicle is travelling at a constant speed, or when the vehicle is decelerating, the amount of oil discharged from the first hydraulic pump does not exceed the sum of the amounts of oil discharged from the second and third hydraulic pumps and for this reason, no hydraulic pressure is generated in the first oil passage. Thus, the first and second hydraulic pressure clutches can be maintained out of engagement, thereby preventing the braking force of the main driven wheels from being transmitted to the sub-driven wheels. A two-wheel drive mode and a four-wheel drive mode can be switched properly from one to the other in accordance with the travelling condition of the vehicle, thereby properly maintaining the distribution of the braking force to the main driven wheels and the sub-driven wheels.

The above and other objects, features and advantages of the invention will become apparent from the following description of a preferred embodiment, taken in conjunction with the accompanying drawings.

BRIEF DESCRIPTION OF THE DRAWINGS

FIG. 7 is a diagram for explaining the operation of the power transmitting device, when the vehicle is travelling backwardly at a constant speed.

DESCRIPTION OF THE PREFERRED EMBODIMENT

The present invention will now be described by way of a preferred embodiment in connection with the accompanying drawings.

Figure 1:
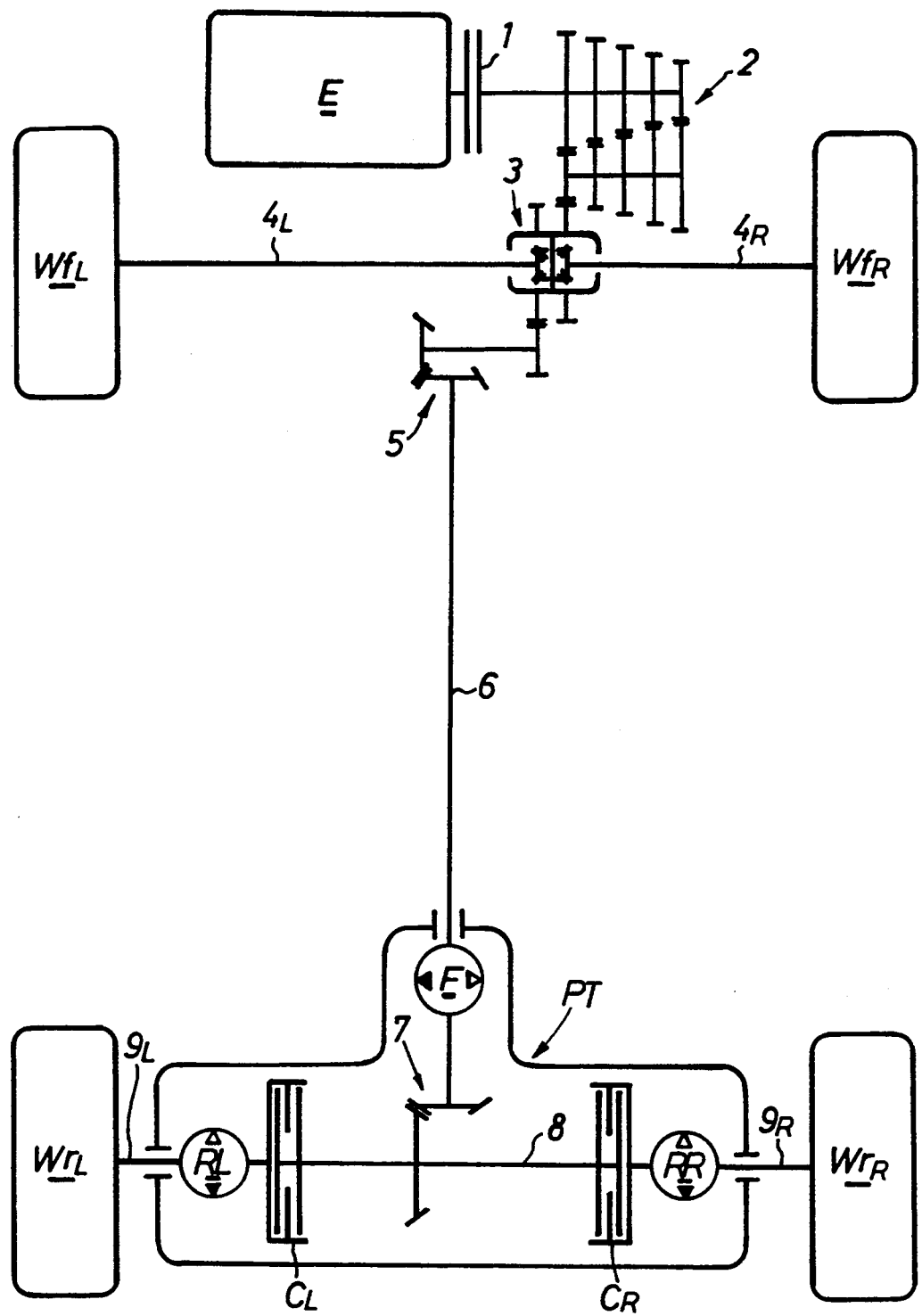
FIG. 1 is a schematic illustration of a power transmitting system in a four-wheel drive vehicle according to the present invention.

Referring to FIG. 1, a driving force from an engine E mounted on a front portion of a four-wheel drive vehicle is supplied through a clutch 1 and a speed-change transmission 2 to a differential 3. The output from the differential 3 is transmitted through a left front wheel axle $4_L$, and a right front wheel axle $4_R$ to a left front wheel $Wf_L$ and a right front wheel $Wf_R$ as main driven wheels. The driving force from the engine E received into the differential 3 is fed through a bevel gear arrangement 5 and a drive shaft 6 to a power transmitting device of this invention, generally designated PT. This power transmitting device PT comprises a rear wheel driving shaft 8 connected through a bevel gear arrangement 7 to the drive shaft 6; a left rear wheel axle $9_t$ connected through a first hydraulic-pressure clutch $C_L$ to the rear wheel driving shaft 8 to drive a left rear wheel $Wr_L$ as a sub-driven wheel; and a right rear wheel axle $9_R$ connected through a second hydraulic-pressure clutch $C_R$ to the rear wheel driving shaft 8 to drive a right rear wheel $Wr_R$ as a sub-driven wheel. The drive shaft 6 is rotatable at a speed proportional to the rotational speed of the left and right front wheels $Wf_L$ and $Wf_R$ and is provided with a first hydraulic pump F. The left and right rear wheel axles $9_L$ and $9_R$ are provided with a second hydraulic pump RL and a third hydraulic pump RR, respectively.

Figure 2:
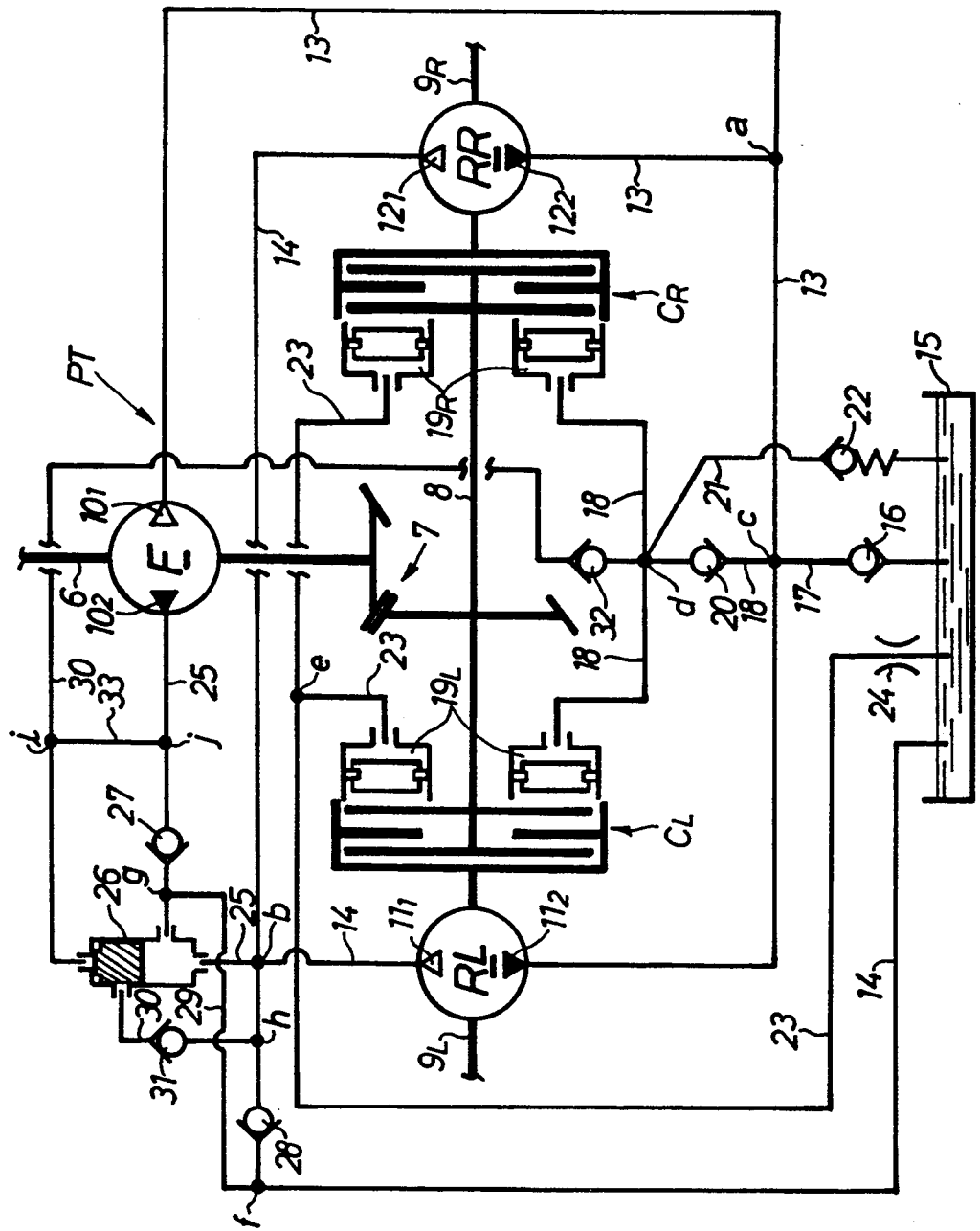
FIG. 2 is a diagram of a hydraulic pressure circuit of a power transmitting device according to the present invention.

The hydraulic pressure system of the power transmitting device PT now will be described with reference to FIG. 2.

The first hydraulic pump F comprises a trochoidal pump or a gear pump of a type in which the oil-discharging direction is reversed in accordance with a reverse in the rotating direction. The first hydraulic pump F includes a first port $10_1$ which serves as a discharge port during forward travelling of the vehicle and as an intake port during backward travelling of the vehicle, and a second port $10_2$ which serves as an intake port during forward travelling of the vehicle and as a discharge port during backward travelling of the vehicle. Each of the second and third hydraulic pumps RL and RR also comprises a trochoidal pump or a gear pump and includes a first port $11_1$, $12_1$ which serves as a discharge port during forward travelling of the vehicle and as an intake port during backward travelling of the vehicle, and a second port $11_2$, $12_2$ which serves as an intake port during forward travelling of the vehicle and as a discharge port during backward travelling of the vehicle.

The first port $10_1$ of the first hydraulic pump F is connected to the second port $11_2$ of the second hydraulic pump RL and the second port $12_2$ of the third hydraulic pump RR through an oil passage (first oil passage) 13 bifurcated at a junction a. The first port $11_1$ of the second hydraulic pump RL and the first port $12_1$ of the third hydraulic pump RR are connected to a reservoir tank 15 through an oil passage 14 bifurcated at a junction b. A junction c of the oil passage 13 and the reservoir tank 15 are interconnected through an oil passage 17 which includes a one-way valve 16 for permitting only a flow of an oil from the reservoir tank 15 to the oil passage 13.

An oil passage (second oil passage) 18, which extends from the junction c of the oil passage 13, is bifurcated at a junction d and connected to a working chamber $19_L$ in the first hydraulic clutch $C_L$ and a working chamber $19_R$ in the second hydraulic clutch $C_R$. A one-way valve 20 is provided in the oil passage 18 for permitting only a flow of the oil from the oil passage 13 to both the working chambers $19_L$ and $19_R$, and a relief valve 22 is provided in an oil passage 21 connecting the oil passage 18 and the reservoir tank 15 for permitting the hydraulic pressure in the working chambers $19_L$ and $19_R$ to escape, when such hydraulic pressure exceeds a predetermined value. The working chambers $19_L$ and $19_R$ in the first and second hydraulic clutches $C_L$ and $C_R$ are connected to the reservoir tank 15 through an oil passage 23 which is bifurcated at a junction e and has an orifice 24 provided therein.

An oil passage 25 connects the second port $10_2$ of the first hydraulic pump F with the junction b of the oil passage 14 extending from the first ports $11_1$ and $12_1$ of the second and third hydraulic pumps RL and RR to the reservoir tank 15. Provided in series in the oil passage 25 are a spool valve 26 shiftable depending upon whether the vehicle is in a forward or backward travelling state, and a one-way valve 27 for permitting only a flow of the oil from the junction b to the second port $10_2$ of the first hydraulic pump F. When the vehicle is travelling forwardly, a spool of the spool valve 26 is shifted to a position shown in FIGS. 3 to 5, because the first ports $11_1$ and $12_1$ of the second and third hydraulic pumps RL and RR serve as the discharge ports. When the vehicle is travelling backwardly, the spool of the spool valve 26 is shifted to a position shown in FIGS. 6 to 8, because the first ports $11_1$ and $12_1$ of the second and third hydraulic pumps RL and RR serve as the intake ports. A one-way valve 28 is provided in the oil passage 14 for permitting only a flow of the oil from the reservoir tank 15 to the junction b. A junction f of the oil passage 14 and a junction g of the oil passage 25 are interconnected by an oil passage 29.

A junction h of the oil passage 14 and the junction d of the oil passage 18 are interconnected by an oil passage 30. The spool valve 26 and two one-way valves 31 and 32 for permitting only a flow of the oil from the junction h to the junction g are provided in the oil passage 30. A junction i of the oil passage 30 and a junction j of the oil passage 25 are interconnected by an oil passage 33.

The sum of the amounts of oil discharged from the second and third hydraulic pumps RL and RR per unit time is set slightly (e.g., 2.5%) larger than the amount of oil discharged from (i.e., the amount of oil drawn into) the first hydraulic pump F per unit time when all of the left and right front and rear wheels $Wf_L$, $Wf_R$, $Wr_L$, and $Wr_R$ are being rotated without slipping or locking.

The operation of this embodiment of the present invention now will be described.

Figure 3:
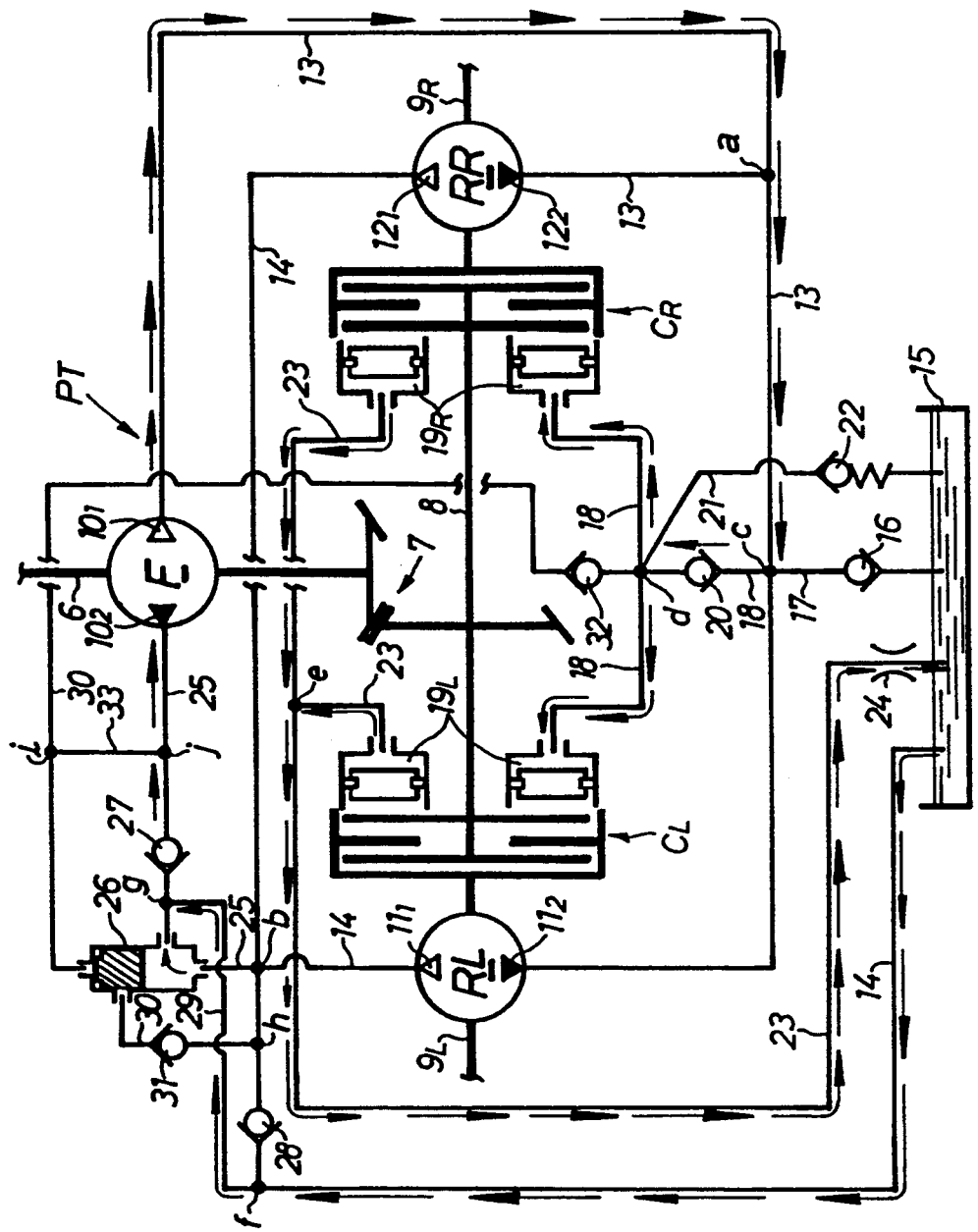
FIG. 3 is a diagram for explaining the operation of the power transmitting device, when the vehicle is starting to travel forwardly.

When the vehicle is first starting to travel forwardly, the driving force from the engine E is transmitted through the clutch 1, the transmission 2, the differential 3 and the left and right front wheel axles $4_L$ and $4_R$ to the left and right front wheels $Wf_l$ and $Wf_r$ and at the same time, is transmitted from the differential 3 through the bevel gear arrangement 5 to the drive shaft 6 to drive the first hydraulic pump F. At that time, the first and second clutches $C_L$ and $C_R$ are out of engagement, so that the left and right rear wheels $Wr_L$ and $Wr$ are not rotated by the engine driving force, and the second and third hydraulic pumps RL and RR are out of operation. Thus, as shown in FIG. 3, the oil in the reservoir tank 15 is drawn into the second port $10_2$ of the first hydraulic pump F, through the oil passage 14, the junction f, the oil passage 29, the junction g and the one-way valve 27 in the oil passage 25, or through the one-way valve 28 in the oil passage 14, the junction b, the spool valve 26 and the one-way valve 27 in the oil passage 25. The oil discharged from the first port $10_1$ of the first hydraulic pump F into the oil passage 13 is not drawn into the second and third hydraulic pumps RL and RR which are out of operation and hence, is passed from the junction c of the oil passage 13 through the one-way valve 20 in the oil passage 18 into the working chambers $19_L$ and $19_R$ in the first and second hydraulic pressure clutches $C_L$ and $C_R$ to start engagement of those clutches and therefrom through the oil passage 23 and the orifice 24 back to the reservoir tank 15.

When the first and second hydraulic pressure clutches $C_L$ and $C_R$ are brought into engagement in the above manner, the rotation of the drive shaft 6 is transmitted through the bevel gear arrangement 7, the rear wheel driving shaft 8 and the first and second hydraulic pressure clutches $C_L$ and $C_R$ to the left and right rear wheel axles $9_L$ and $9_R$ to rotate the left and right rear wheels $Wr_L$ and $Wr_R$ and the second and third hydraulic pumps RL and RR. This causes the driving force from the engine E to be distributed not only to the left and right front wheels $Wf_L$ and $Wf_R$ but also to the left and right rear wheels $Wr_L$ and $Wr_R$ during starting of the vehicle to travel forwardly, so that vehicle is brought into a four-wheel drive mode.

If a difference is generated between the amounts of oil discharged from (or drawn into) the first hydraulic pump F, and the second and third hydraulic pumps RL and RR in this manner, a hydraulic pressure corresponding to a preset load of the relief valve 22 is immediately applied to both the working chambers $19_L$ and $19_R$ in the first and second hydraulic pressure clutches $C_L$ and $C_R$. After opening of the relief valve 22, a hydraulic pressure determined by such difference between the amounts of oil discharged and a pressure drop characteristic of the orifice 24 provided in the oil passage 14 is applied to both the working chambers $19_L$ and $19_R$. The upper limit value of such hydraulic pressure is limited by the preset load of the relief valve 22 and therefore, the upper limit value of a torque transmitted to the first and second hydraulic pressure clutches $C_L$ and $C_R$ can be adjusted by properly setting the preset load.

When the left and right rear wheels $Wr_L$ and $Wr_R$ start their rotation to operate the second and third hydraulic pumps RL and RR, a portion of the oil discharged from the first port $10_1$ of the first hydraulic pump F into the oil passage 13 is drawn into the second ports $11_2$ and $12_2$ of the second and third hydraulic pressure pumps RL and RR, and the oil discharged from the first ports $11_1$ and $12_1$ into the oil passage 14 is passed from the junction b through the spool valve 26 and further through the one-way valve 27 in the oil passage 25 into the second port $10_2$ of the first hydraulic pump F. If the rotational speed of the left and right rear wheels $Wr_L$ and $Wr_R$ is gradually increased, the difference between the amounts of oil discharged from the first hydraulic pump F, and the second and third hydraulic pumps RL and RR is decreased, so that the engagement force of the first and second hydraulic pressure clutches $C_L$ and $C_R$ is reduced.

Figure 4:
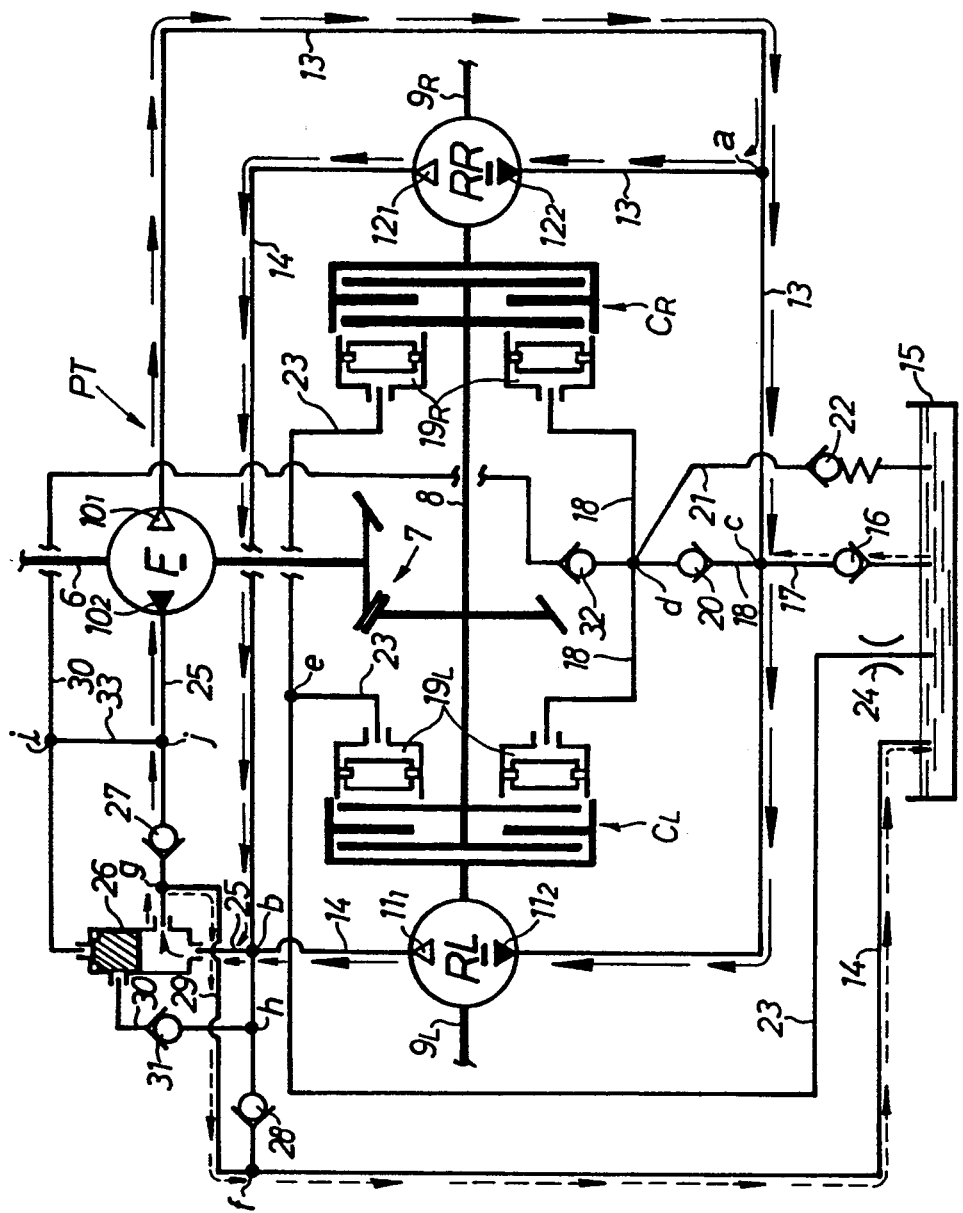
FIG. 4 is a diagram for explaining the operation of the power transmitting device, when the vehicle is travelling forwardly at a constant speed.

When the difference between the rotational speeds of the left and right front wheels $Wf_l$ and $Wf_R$ and the left and right rear wheels $Wr_L$ and $Wr_R$ approaches zero, thereby causing the vehicle to be switched to a constant speed travel mode, the amount of oil discharged from the first hydraulic pump F becomes equal to the sum of the amounts of oil drawn into the second and third hydraulic pumps RL and RR, so that no oil is supplied to the working chambers $19_L$ and $19_R$ in the first and second hydraulic pressure clutches $C_L$ and $C_R$ as shown in FIG. 4 and thus, the distribution of the driving force to the left and right rear wheels $Wr_L$ and $Wr_R$ is completely cut off, thereby causing the vehicle to be switched to a front wheel drive mode. As described above, the sum of the amounts of oil discharged from the second and third hydraulic pumps RL and RR is slightly larger than the amount of oil discharged from the first hydraulic pump F, when the rotational speed of the left and right front wheels $Wf_L$ and $Wf_R$ and the rotational speed of the left and right rear wheels $Wr_L$ and $Wr_R$ are completely equal to each other. For this reason, a surplus amount of the oil discharged from the second and third hydraulic pumps RL and RR into the oil passage 14 is returned from the junction g of the oil passage 25 through the oil passage 29, the junction f and the oil passage 14 to the reservoir tank 15, and a deficiency of the oil supplied to the second and third hydraulic pumps RL and RR is supplied from the reservoir tank 15 through the oil passage 17 having the one-way valve 16 provided therein into the oil passage 13. Dashed line arrows in FIG. 4 indicate flows of the surplus oil and the deficient oil.

If only the left and right front wheels $Wf_L$ and $Wf_R$ tread on a road surface of a low friction coefficient during travelling of the vehicle at a constant speed, or if the speed of the vehicle is intended to be increased suddenly by a driver, the left and right front wheels $Wf_L$ and $Wf_R$ may be transiently brought into a slipping state in some cases. In such a condition, the amount of oil discharged from the first hydraulic pump F is more than the sum of the amounts of oil discharged from the second and third hydraulic pumps RL and RR, and the first and second hydraulic pressure clutches $C_L$ and $C_R$ are brought into engagement, thereby providing the four-wheel drive mode in which the driving force is distributed to the left and right rear wheels $Wr_L$ and $Wr_R$.

When a hard braking has been applied during a forward travelling of the vehicle, the left and right front wheels $Wf_L$ and $Wf_R$ are locked earlier than the left and right rear wheels $Wr_l$ and $Wr_R$, because the distribution of a braking force to the front and rear wheels is generally set so that the distribution of the braking force to the left and right front wheels Wf$_L$ and Wf$_R$ is higher than that to the left and right rear wheels Wr$_L$ and Wr$_R$. Further, an engine braking effect, such as by releasing the accelerator pedal, from the constant speed travel condition is applied to only the left and right front wheels Wf$_L$ and Wf$_R$ and even in this case, the rotational speed of the left and right front wheels Wf$_L$ and Wf$_R$ is transiently lower than that of the left and right rear wheels Wr$_L$ and Wr$_R$.

Figure 5:
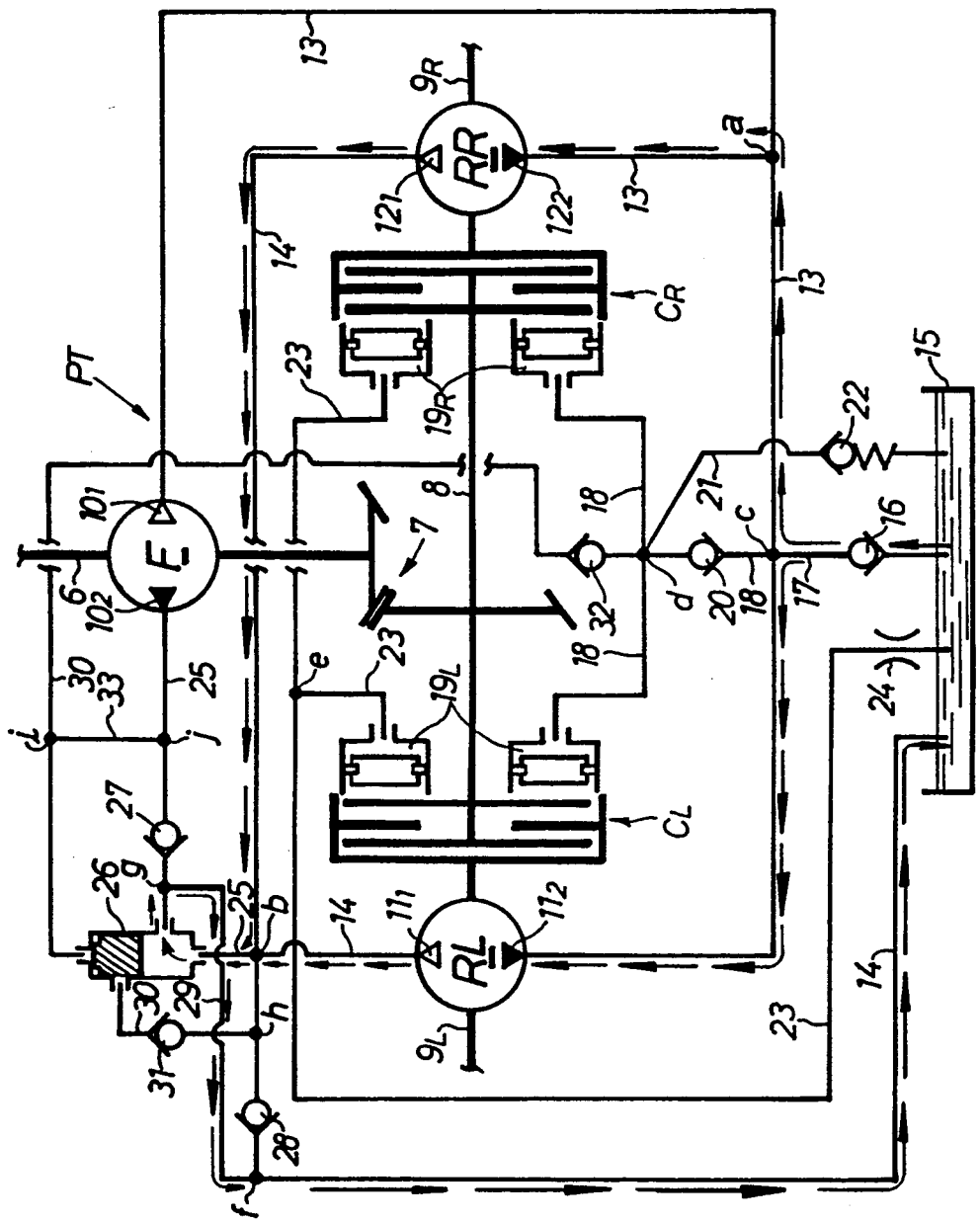
FIG. 5 is a diagram for explaining the operation of the power transmitting device, when the forward travelling speed of the vehicle is being reduced.

In such a case, the sum of the amounts of oil discharged from the second and third hydraulic pumps RL and RR exceeds the amount of oil drawn into the first hydraulic pump F, as shown in FIG. 5, so that the surplus oil is returned from the junction g of the oil passage 25 through the oil passage 29, the junction f and the oil passage 14 into the reservoir tank 15, while the deficiency of the oil supplied into the second and third hydraulic pumps RL and RR is supplied from the reservoir tank 15 through the oil passage 17 having the one-way valve 16 provided therein into the oil passage 13. Thus, the oil passage 13 is brought into a negative pressure state, so that the first and second hydraulic clutches C$_L$ and C$_R$ are maintained out of engagement, thereby ensuring that the engine braking force on the left and right front wheels Wf$_L$ and Wf$_R$ is not transmitted to the left and right rear wheels Wr$_L$ and Wr$_R$, leading to the avoidance of a disadvantage that the distribution of the engine braking force is changed between the front and rear wheels. Further, if the left and right front wheels Wf$_L$ and Wf$_R$ become completely locked, the first hydraulic pump F is stopped, and only the second and third hydraulic pumps RL and RR are rotated. Even in this case, however, the first and second hydraulic clutches C$_L$ and C$_R$ are maintained out of engagement, thereby preventing the distribution of the engine braking force from being changed between the front and rear wheels in the same manner as described above.

During backward travelling of the vehicle, the rotating directions of the hydraulic pumps F, RL and RR are reversed together, so that the relationship between the discharge and intake ports is reversed from the above-described relationship.

Figure 6:
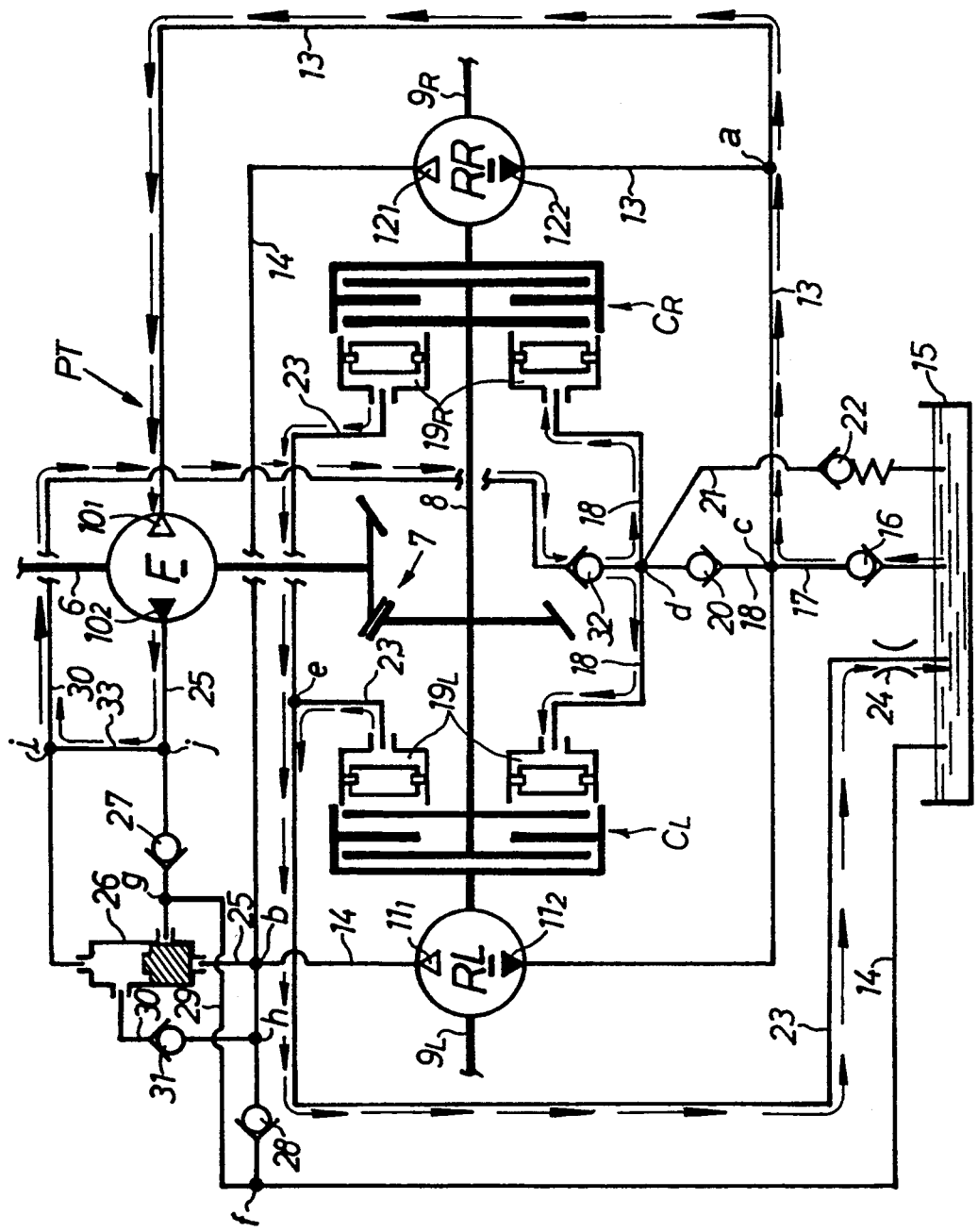
FIG. 6 is a diagram for explaining the operation of the power transmitting device, when the vehicle is starting to travel backwardly.

More specifically, if the rotational speed of the left and right front wheels Wf$_L$ and Wf$_R$ is larger than that of the left and right rear wheels Wr$_L$ and Wr$_R$ when the vehicle is first starting to travel backwardly, or when the backward travelling speed of the vehicle is increased suddenly, the amount of oil discharged from the first hydraulic pump F is more than the sum of the amounts of oil discharged from the second and third hydraulic pumps RL and RR and hence, a hydraulic pressure is generated in the oil passage 18. For example, when the vehicle is starting to travel backwardly, as shown in FIG. 6, the oil in the reservoir tank 15 is drawn through the oil passage 17 having the one-way valve 16 provided therein and the oil passage 13 into the first hydraulic pump F, and the oil discharged from the first hydraulic pump F into the oil passage 25 is supplied through the oil passage 33, the oil passage 30 having the one-way valve 32 provided therein and the oil passage 18 into both the working chambers 19$_L$ and 19$_R$, so that the first and second hydraulic clutches C$_L$ and C$_R$ are brought into engagement, thereby bringing the vehicle into the four-wheel drive mode.

Figure 7:
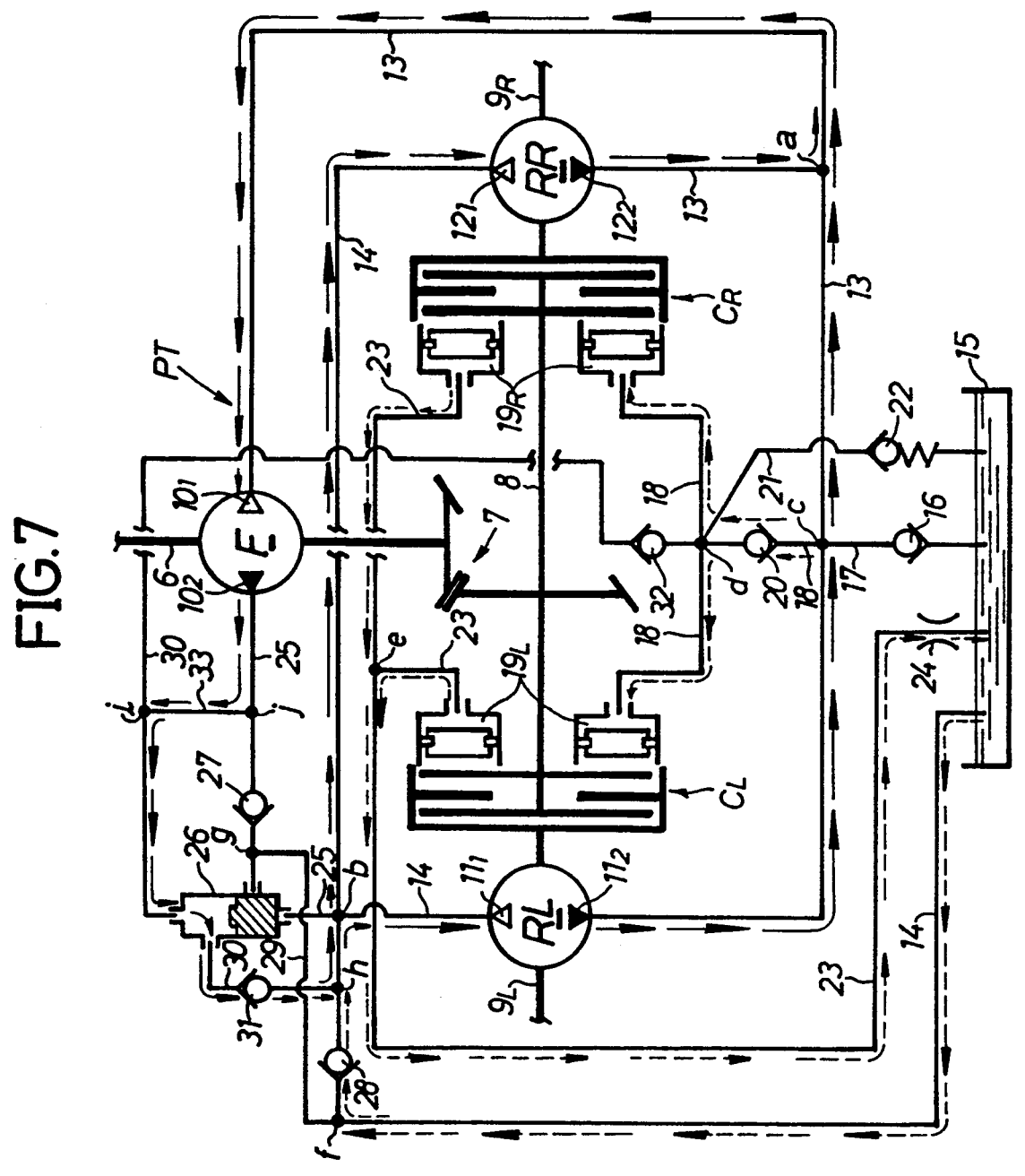

When the vehicle reaches a constant speed reverse travel mode, thereby causing the rotational speed of the left and right front wheels Wf$_L$ and Wf$_R$ and the rotational speed of the left and right rear wheels Wr$_L$ and Wr$_R$ to be completely equal to each other, the surplus amount of the oil discharged from the second and third hydraulic pumps RL and RR is supplied through the oil passage 18 into the working chambers 19$_L$ and 19$_R$ in the first and second hydraulic pressure clutches C$_L$ and C$_R$, as shown in FIG. 7, thereby maintaining the vehicle in the four-wheel drive mode, because the sum of the amounts of oil discharged from the second and third hydraulic pumps RL and RR is set slightly larger than the amount of oil discharged from the first hydraulic pump F, as described above. Dashed line arrows in FIG. 7 indicate flows of surplus oil discharged by the second and third hydraulic pumps RL and RR and flows of the deficient oil supplied from the reservoir tank 15 into the second and third hydraulic pumps RL and RR.

Figure 8:
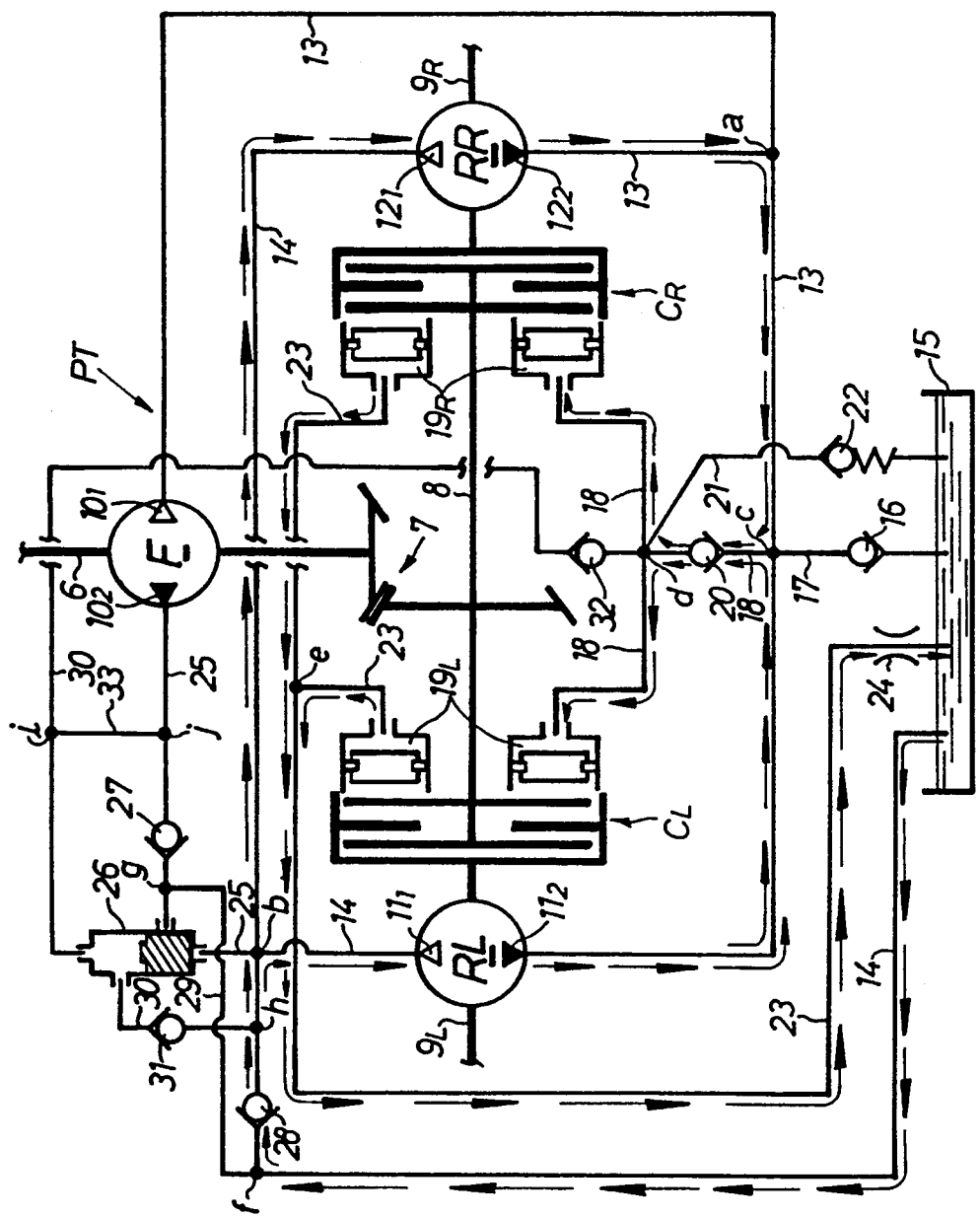
FIG. 8 is a diagram for explaining the operation of the power transmitting device, when the backward travelling speed of the vehicle is being reduced.

During braking of the vehicle which is travelling backwardly, the ground pressure on the rear wheels Wr$_L$ and Wr$_R$ is increased by the inertia of the vehicle body, while the ground pressure on the front wheels Wf$_L$ and Wf$_R$ is decreased, and for this reason, the front wheels Wf$_L$ and Wf$_R$ are liable to become locked, but because the sum of the amounts of oil discharged from the second and third hydraulic pumps RL and RR is more than the amount of oil discharged from the first hydraulic pump F, a hydraulic pressure is generated in the oil passages 13 and 18, so that the first and second hydraulic pressure clutches C$_L$ and C$_R$ are brought into engagement, thereby bringing the vehicle into the four-wheel drive mode, as shown in FIG. 8. Therefore, in this case, the rotative force of the rear wheels Wr$_L$ and Wr$_R$ is transmitted through the first and second hydraulic clutches C$_L$ and C$_R$ toward the front wheels Wf$_L$ and Wf$_r$, thereby making it possible to inhibit the complete locking of the front wheels Wf$_L$ and Wf$_R$.

Although the preferred embodiment of the present invention has been described in detail, it will be understood that the present invention is not limited to this embodiment, and various minor modifications in design can be made without departing from the spirit and scope of the invention defined in claims.

What is claimed is:

1. A power transmitting device for a four-wheel drive vehicle which includes main driven wheels driven directly by an engine and speed-change transmission, comprising;
    a left sub-driven wheel driven through a first hydraulic pressure clutch,
    a right sub-driven wheel driven through a second hydraulic pressure clutch,
    a first hydraulic pump driven in operative association with the main driven wheels,
    a second hydraulic pump driven in operative association with the left sub-driven wheel,
    a third hydraulic pump driven in operative association with the right sub-driven wheel,
    a first oil passage which connects a discharge port of the first hydraulic pump to intake ports of the second and third hydraulic pumps, and
    a second oil passage which connects the first oil passage to a working chamber in the first hydraulic pressure clutch and a working chamber in the second hydraulic pressure clutch.

2. A power transmitting device for a four-wheel drive vehicle according to claim 1, wherein said main driven wheels are front wheels of the vehicle, and said sub-driven wheels are rear wheels.

3. A power transmitting device for a four-wheel drive vehicle according to claim 1, wherein said second and third hydraulic pumps have a combined discharge rate larger than a discharge rate of said first hydraulic pump.

4. A power transmitting device for a four-wheel drive vehicle according to claim 3, wherein said second and third hydraulic pumps have the same discharge rate.

5. A power transmitting device for a four-wheel drive vehicle according to claim 1, wherein the three said hydraulic pumps and said first and second oil passages are arranged in a hydraulic circuit having means, together with said pumps and passages, for causing a driving force on said left and right sub-driven wheels for four-wheel drive in a forward travel direction only when the vehicle is first starting in said forward travel direction and when the vehicle is accelerating.

6. A power transmitting device for a four-wheel drive vehicle according to claim 5, wherein said driving force on said left and right sub-driven wheels for four-wheel drive is caused in a rearward travel direction under an acceleration, a deceleration and a braking.

7. A power transmitting device for a four-wheel drive vehicle according to claim 1, wherein each of the three said hydraulic pumps have a reverse direction and operate in said reverse direction when the vehicle is in a rearward travel direction.

8. A power transmitting device for a four-wheel drive vehicle according to claim 7, wherein a spool valve having two positions is provided in a hydraulic circuit with the three said hydraulic pumps and two said oil passages, and said spool valve is selectively shifted between said two positions for said forward and rearward travel directions.

9. A power transmitting device for a four-wheel drive vehicle according to claim 1, wherein a relief valve is provided in said second oil passage.

10. A power transmitting device for a four-wheel drive vehicle according to claim 1, wherein a third oil passage connects both of said working chambers to a reservoir through an orifice.

11. A power transmitting device for a four-wheel drive vehicle which includes main driven wheels driven directly by an engine and speed-change transmission, comprising, a left sub-driven wheel driven through a first hydraulic pressure clutch, a right sub-driven wheel driven through a second hydraulic pressure clutch, a first hydraulic pump driven in operative association with the main driven wheels, a second hydraulic pump driven in operative association with the left sub-driven wheel, a third hydraulic pump driven in operative association with the right sub-driven wheel, and means interconnecting the three said hydraulic pumps and the two said hydraulic pressure clutches for causing engagement of said hydraulic pressure clutches for producing a driving force on said left and right sub-driven wheels for four-wheel drive in a forward travel direction of the vehicle only when the vehicle is first starting forward travel and when the vehicle is accelerating.

12. A power transmitting device for a four-wheel drive vehicle according to claim 11, wherein said main driven wheels are front wheels of the vehicle, and said sub-driven wheels are rear wheels.

13. A power transmitting device for a four-wheel drive vehicle according to claim 11, wherein said second and third hydraulic pumps have a combined discharge rate larger than a discharge rate of said first hydraulic pump.

14. A power transmitting device for a four-wheel drive vehicle according to claim 13, wherein said second and third hydraulic pumps have the same discharge rate.

15. A power transmitting device for a four-wheel drive vehicle according to claim 11, wherein said driving force on said left and right sub-driven wheels for four-wheel drive is caused in a rearward travel direction under an acceleration, a deceleration and a braking.

16. A power transmitting device for a four-wheel drive vehicle according to claim 11, wherein each of the three said hydraulic pumps operates in a reverse direction when the vehicle is in a rearward travel direction.

17. A power transmitting device for a four-wheel drive vehicle according to claim 16, wherein a spool valve having two positions is provided in a hydraulic circuit with the three said hydraulic pumps, and said spool valve is selectively shifted between said two positions for said forward and rearward travel directions.

18. A power transmitting device for a four-wheel drive vehicle according to claim 11, wherein a relief valve is provided in operative association with said first and second hydraulic pressure clutches for regulating a maximum pressure applied to said clutches.

19. A power transmitting device for a four-wheel drive vehicle according to claim 11, wherein an oil passage means having an orifice connects said first and second hydraulic pressure clutches to a reservoir.

20. A power transmitting device for a four-wheel drive vehicle which includes main driven wheels driven directly by an engine and speed-change transmission, comprising a left sub-driven wheel driven through a hydraulic pressure clutch, a right sub-driven wheel driven through a second hydraulic pressure clutch, a first hydraulic pump driven in operative association with the main driven wheels, and hydraulic means interconnecting said hydraulic pump and the two said hydraulic pressure clutches for causing engagement of said hydraulic pressure clutches for producing a driving force on said left and right sub-driven wheels for four-wheel drive in a forward travel direction of the vehicle when the speed of rotation of the main driven wheels exceed the speed of rotation of the left and right sub-driven wheels.

21. A power transmitting device for a four-wheel drive vehicle according to claim 20, wherein said hydraulic means includes means responsive to the speed of rotation of each of said sub-driven wheels.

22. A power transmitting device for a four-wheel drive vehicle according to claim 20, wherein said driving force on said left and right sub-driven wheels for four wheel drive is caused in a rearward travel direction under an acceleration, a deceleration and a braking.

23. A power transmitting device for a four-wheel drive vehicle according to claim 22, wherein a spool valve having two positions is provided in said hydraulic means and said spool valve is selectively shifted between said two positions for said forward and rearward travel directions.

24. A power transmitting device for a four-wheel drive vehicle according to claim 20, wherein a relief valve is provided and operatively connected to said first and second hydraulic pressure clutches for regulating a maximum pressure applied to said clutches.

25. A power transmitting device for a four-wheel drive vehicle according to claim 20, wherein an oil passage means having an orifice connects said first and second hydraulic pressure clutches to a reservoir.

* * * * *